(12) United States Patent
Selvaraj

(10) Patent No.: US 8,713,333 B1
(45) Date of Patent: Apr. 29, 2014

(54) APPARATUS AND METHOD TO SIMULATE A POWER TRIP TO A DISK DRIVE

(75) Inventor: Gomez Samvasanthan Selvaraj, Udumalpet (IN)

(73) Assignee: Western Digital Technologies, Inc., Irvine, CA (US)

( * ) Notice: Subject to any disclaimer, the term of this patent is extended or adjusted under 35 U.S.C. 154(b) by 371 days.

(21) Appl. No.: 13/070,751

(22) Filed: Mar. 24, 2011

(51) Int. Cl.
G06F 1/00 (2006.01)

(52) U.S. Cl.
USPC .......................................... 713/300

(58) Field of Classification Search
None
See application file for complete search history.

(56) References Cited

U.S. PATENT DOCUMENTS

| | | | |
|---|---|---|---|
| 4,517,512 A * | 5/1985 | Petrich et al. | 714/724 |
| 4,725,968 A | 2/1988 | Baldwin et al. | |
| 5,936,817 A * | 8/1999 | Matsko et al. | 361/72 |
| 6,304,839 B1 | 10/2001 | Ho et al. | |
| 6,714,887 B1 | 3/2004 | Wong et al. | |
| 7,596,722 B1 | 9/2009 | Pakzad et al. | |
| 7,757,124 B1 * | 7/2010 | Singh et al. | 714/32 |
| 2003/0236644 A1 * | 12/2003 | Lara et al. | 702/121 |
| 2008/0104387 A1 * | 5/2008 | Owhadi et al. | 713/2 |
| 2009/0036115 A1 * | 2/2009 | Chang | 455/423 |
| 2009/0265136 A1 | 10/2009 | Garcia et al. | |

* cited by examiner

Primary Examiner — Mohammed Rehman
Assistant Examiner — Austin Hicks

(57) ABSTRACT

Disclosed is a disk drive test system to simulate a power trip to a disk drive, a cell, and a test computer. The disk drive test system comprises: a disk drive coupled to a cell, a test computer coupled to the cell and the disk drive, and a power trip simulator. The power strip simulator is coupled to the disk drive and the test computer and is configured to cut off power to the test computer, the cell, and the disk drive in response to a trigger pulse received from the disk drive, wherein the power trip simulator restores power to the test computer, the cell, and the disk drive after a pre-set time duration.

16 Claims, 3 Drawing Sheets

APPARATUS AND METHOD TO SIMULATE A POWER TRIP TO A DISK DRIVE

BACKGROUND

Computing devices are routinely used at work, at home, and everywhere else. Computing devices advantageously enable electronic communication, data sharing (e.g., documents, pictures, music, film, etc.), the use of application-specific software, and access to information for electronic commerce through the Internet and other computer networks. The term computing device generally refers to desktop computers, laptop computers, servers, mobile computing devices (e.g., personal digital assistants (PDAs), cell-phones, etc.), as well as any other type of computer system. A computing device typically includes many components such as processors, memory, disk drives, as well as many other types of electronic devices, electromechanical devices, and mechanical devices.

A huge market exists for disk drives, and in particular, hard disk drives (HDDs) for mass-market computer systems such as servers, desktop computers, laptop computers, and mobile computers. To be competitive in this market, a hard disk drive should be relatively inexpensive, and should accordingly embody a design that is adapted for low-cost mass production. Further, there exists substantial competitive pressure to continually develop hard disk drives that have increasingly higher storage capacity and that provide for faster access to data. Satisfying these competing constraints of low-cost, high capacity, and rapid access requires innovation in each of numerous components and methods of assembly and testing HDDs.

Typically, the main assemblies of a hard disk drive are a head disk assembly ("HDA") and a printed circuit board assembly ("PCBA"). The HDA typically includes at least one magnetic disk ("disk"), a spindle motor for rotating the disk, and a head stack assembly ("HSA") that includes a head with at least one transducer for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head toward the disk; and (3) a flex cable assembly that provides an electrical interconnect with minimal constraint on movement. The PCBA typically includes signals for processing signals and controlling operations.

After the HDA and the PCBA are mated, the disk drive must undergo a variety of tests and procedures to configure and validate the proper operation of the disk drive. Such testing is often carried out in a disk drive test platform system that includes a bank of cells into which the disk drives are loaded and unloaded. A sequential series of tests and procedures are then carried out on the loaded disk drives. Some of the test and procedures are subject to strict environmental control requirements. Typically, the disk drives remain in the same cell during the administration of an entire sequence of tests (e.g., servo writing, microcode testing, etc), and are removed in batch only at the conclusion of the sequence of tests.

However, during testing, power trips may occur to the disk drive test system disrupting the testing of disk drives. Unfortunately, if a power trip occurs, oftentimes the disk drives fail the testing process and cannot recover due to firmware and/or software issues. The firmware and/or software issues for the disk drives have to resolved and the disk drives re-tested. This has become a major setback in the disk drive manufacturing process. Due to the increasing testing demands for disk drives and the number of disk drives that are attempted to be manufactured and tested each day, power trips that occur to disk drive test systems result in huge manufacturing losses in terms of both costs and delay time.

Accordingly, improved techniques to increase the reliability of testing with disk drive test systems, such as resolving disk drive testing downtime due power trips, are continuously sought after.

DETAILED DESCRIPTION

Embodiments of the invention relate to a disk drive test system that simulates a power trip to a disk drive, a cell, and a test computer such that the power tripping and recovery of the disk drive, the cell, and the test computer occur in a controlled environment. Recovery issues related to firmware and software for the disk drive can then be debugged and fixed in a controlled environment such that when the disk drive is tested in a complete disk drive test platform system in real-time, and a power trip occurs, the disk drive quickly recovers for continued testing with greatly decreased amounts of down time. In essence, feed forward testing occurs utilizing the disk drive test system to simulate the power trip to the cell and the disk drive such that recovery issues are identified, debugged, and fixed before it occurs in real-time during manufacturing testing in the complete disk drive test platform system.

Figure 1:
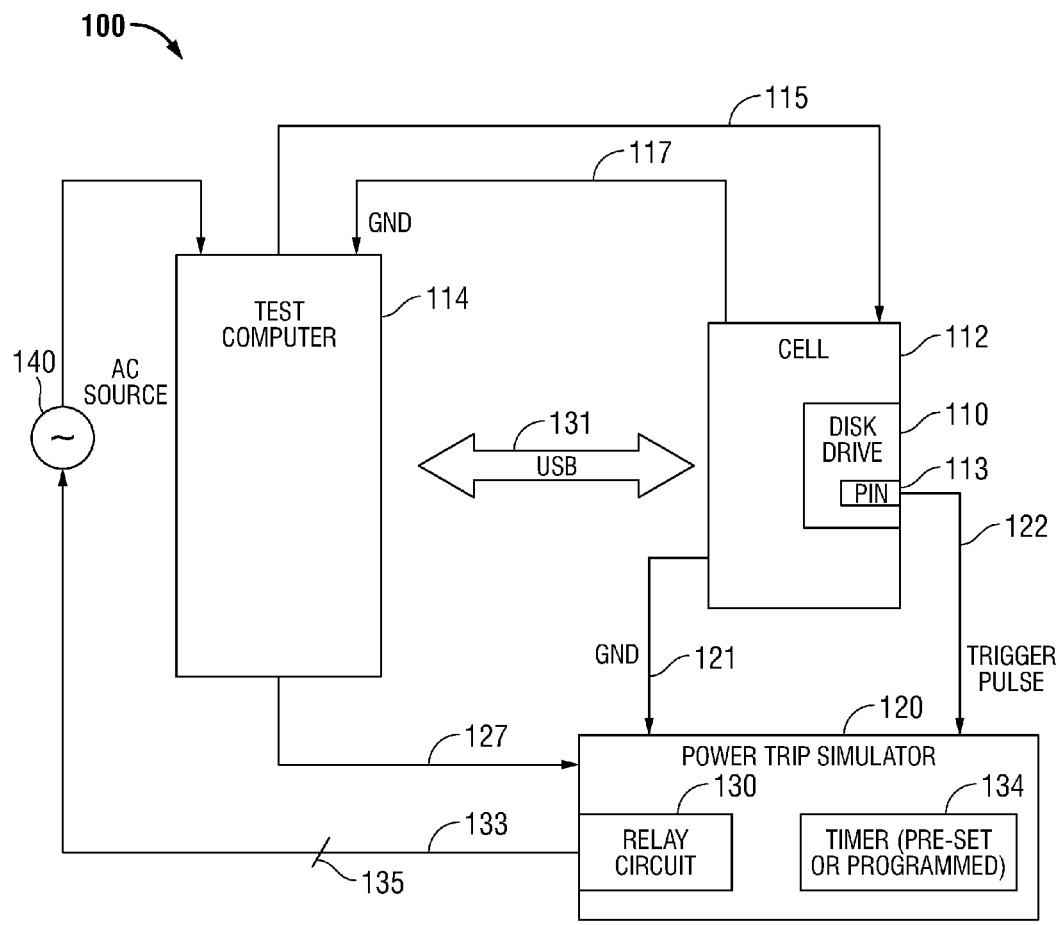
FIG. 1 is a block diagram of a disk drive test system that is used to stimulate a power trip to a disk drive, a cell, and a test computer, according to one embodiment of the invention.

FIG. 1 is a block diagram view of a disk drive test system 100 that is used to stimulate a power trip to a disk drive 110, a cell 112, and a test computer 114. The disk drive test system 100 includes disk drive 110 coupled to the cell 112 and a test computer 114 that is coupled to both the cell 112 and the disk drive 110. Further, a power trip simulator 120 is coupled to both the disk drive 110 and the test computer 114. The power trip simulator 120 is configured to cut off power to the test computer 114, the cell 112, and the disk drive 110 in response to a trigger pulse 122 received from the disk drive 110. The power trip simulator 120 then restores power to the test computer 114, the cell 112, and the disk drive 110 after a pre-set time duration.

It should be noted that the test computer 114 may communicate data to disk drive 110 and cell 112 via a USB link 131. Further, test computer 114 is powered by AC source 140 and powers cell 112 and disk drive 110 via line 115 and the power strip simulator via line 127. Also, cell 112 and disk drive 110 may be grounded to the power trip simulator 120 and test computer 114 via lines 121 and 117, respectively. Further, line 133 connects a relay circuit 130 of the power trip similar 120 to the AC source 140.

In one embodiment, the disk drive 110 includes a test pin 113 that is connected to the PCBA of the disk drive 110 and the test pin 113 transmits the trigger pulse 122 from the disk drive 110 to the power trip stimulator 120. Further, in one embodiment, the test computer 114 includes code that is transmitted to disk drive 110 (e.g., via USB link 131) that instructs disk drive 110 how to transmit the trigger pulse 122 and this triggering code is stored in a flash memory of the disk drive. Disk drive 110 thereby includes triggering code that is stored in flash memory to instruct disk drive 110 as to how to transmit the trigger pulse 122 through pin 113 to initiate the power trip disk drive testing process. In this way, when test computer 114 instructs disk drive 110 to initiate the test process by transmitting the trigger pulse 122 to the power trip stimulator 120, disk drive 110 has well-defined code to do so.

In one embodiment, the power trip simulator 120 may include a relay circuit 130 that has a pre-set time duration or a programmable time duration. Relay circuit 130 may obtain its pre-set time or a programmable time from a timer/counter 134. In one embodiment, the relay circuit 130 is set to a pre-set time duration of 10 seconds by which it is commanded opened and then closed by timer 134. However, any suitable time duration may be used and may be pre-set or programmed and controlled by timer 134.

For example, the relay circuit 130 may be triggered (i.e., opened) to cut off power to the test computer 114, the cell 112, and the disk drive 110 (by disabling AC source 140) in response to the trigger pulse 122 received from the disk drive 110 (responsive to a cut power command from the test computer 114). The power trip simulator 120 may then restore power to the test computer 114, the cell 112, and the disk drive 110 after the pre-set or programmed time duration has been counted by the timer 134 by commanding the closing of the relay circuit 130 to enable AC source 140.

In this example, the relay circuit 130 is triggered by the trigger pulse 122 and is opened to cut off power to the test computer 114, the cell 112 and the disk drive 110 for a pre-set or pre-programmed time, which is counted by timer 134, and then the relay circuit 130 is closed to restore power to the test computer 114, the cell 112, and the disk drive 110 after the pre-set or programmed time has been counted by the timer 134. As can be seen in FIG. 1, the disk drive test system 100 may include an AC power source 140 to power the test computer 114, the cell 112, and the disk drive 110, which may be cut off by line 133 (see cut-off 135) by the relay circuit 130 of the power trip simulator 120.

In one embodiment, the power trip simulator 120 may include an increment button and a decrement button for the timer 134 to allow a user to program the time duration for the restoration of power and a display to allow an operator to view the programmable time duration to restore power. However, it should be appreciated that the timer may be programmed by a wide variety of different types of input devices.

Continuing with this example, disk drive test system 100 may implement a method of tripping the disk drive 110 and the test computer 114 based upon the trigger pulse 122 from the disk drive 110 itself to the power trip simulator 120. The test computer 114 may initiate the testing process by commanding the disk drive 110 to transmit the trigger pulse 122 to start the process. The disk drive 110 may utilize the triggering code to initiate the transmission of the trigger pulse 122. In particular, the trigger pulse 122 may be sent from the pin 113 of the disk drive 110 to the power trip simulator 120.

In this example, the test computer 114 via USB link 131 instructs the disk drive 110 contained in cell 112 to begin the testing process. Disk drive 110 by utilizing the test triggering code then transmits the trigger pulse 112 from pin 113 to the power trip simulator 120. Once tripped, the relay circuit 130 of power trip simulator 120 is opened to cut off power to the test computer 114 and disk drive 110 by disabling AC source 140 by disabling line 133 (see cut-off 135). Power is then restored, after the power out time duration is counted, by closing the relay circuit 130 to enable line 133 to the AC source 140 to enable power to the test computer 114 and via line 115 to the cell 112 and disk drive 110.

After power is restored, the test computer 114 may be used to debug errors associated with the disk drive 110 that occurred from the simulated power trip. Thus, the power trip is simulated in a controlled environment and disk drive testers can identify bugs that occur in the disk drive 110 when a power outage occurs and fix the bugs in the software/firmware of the disk drive 110. In this way, during real manufacturing testing in a complete disk drive test platform system in real-time, when a power trip occurs, the disk drive 110 quickly recovers for continued testing with greatly decreased amounts of down time. Thus, if a power outage occurs during the testing of a disk drive, the testing does not have to be stopped because the error has already been pre-resolved such that testing can continue.

In this way, feed forward testing occurs utilizing the disk drive test system 100 to simulate the power trip to the cell 112 and the disk drive 110 such that recovery issues are identified, debugged, and fixed before it occurs during real manufacturing testing in the complete disk drive test platform system. This is beneficial because the firmware and software of a disk drive typically already has production code and it may have certain bugs that may occur if a power outage occurs during disk drive testing (e.g., servo writing testing, microcode testing, etc.) By performing a power trip in a simulated environment, the firmware and software code of the disk drive can be debugged and fixed such that these errors will not occur during actual manufacturing testing such that a great deal of manufacturing time and costs can be saved.

Figure 2:
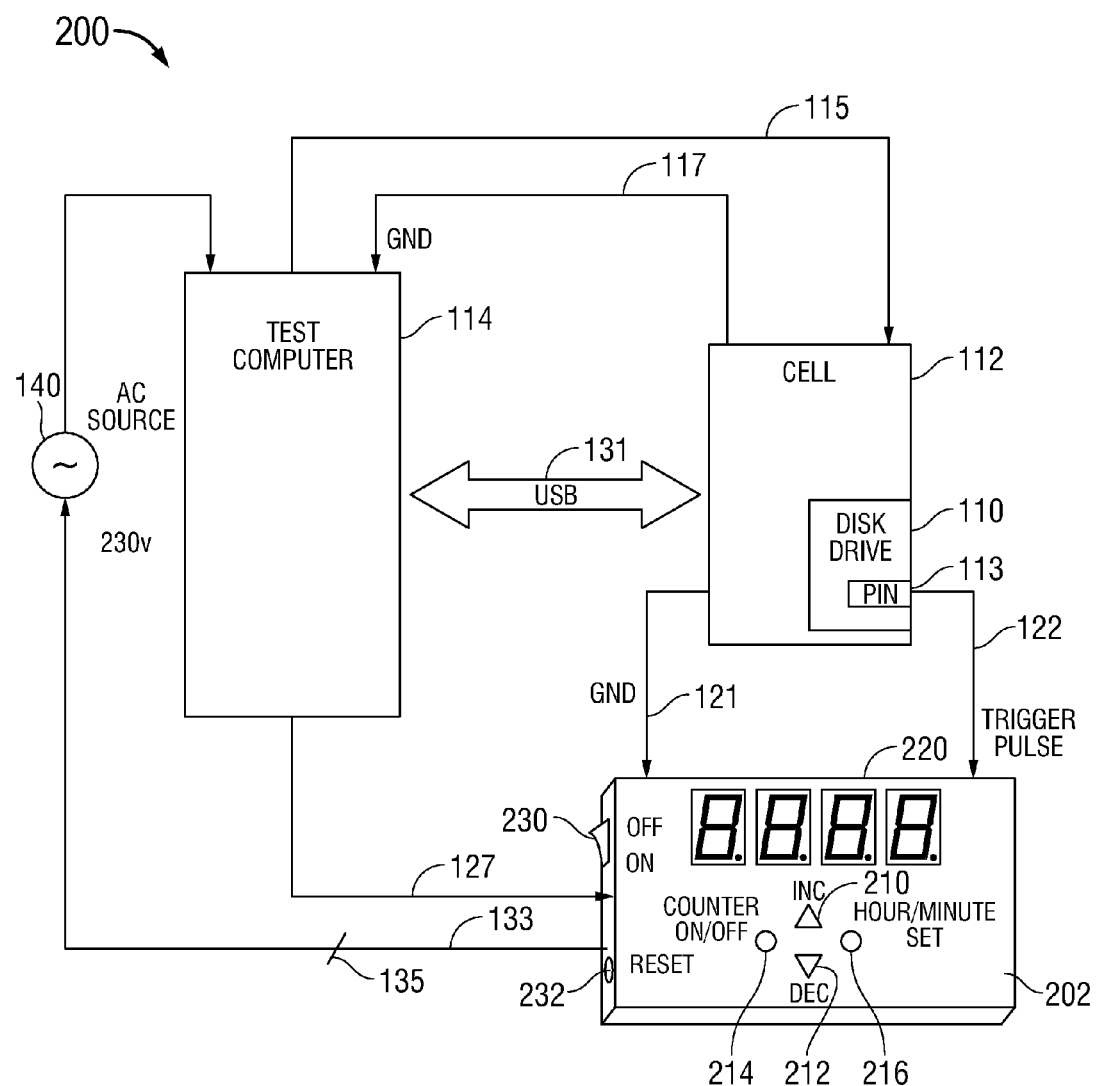
FIG. 2 is a block diagram of a particular type of power trip simulator, according to one embodiment of the invention.

Turning now to FIG. 2, a particular type of power trip simulator 202 is illustrated that may be utilized with embodiments of the invention. The test computer 114, cell 112, disk drive 110 and lines remain similar to those previously described with reference to FIG. 1 and will not be repeated for brevity's sake.

In this embodiment, the power trip simulator 202 may include an increment button 210, a decrement button 212, a counter on/off button 214, an hour/minute/set button 216, and a display 220 to allow an operator to select a triggering time duration. Further, the power trip simulator 202 includes an ON/OFF button 230 and a reset button 232. The power trip simulator 202 may also include a microcontroller to control functionality.

The increment button 210 and the decrement button 212 allow an operator to select a triggering time duration in which the triggering time duration measures a time duration from the time the trigger pulse 122 is received from the disk drive 110 before triggering the relay circuit 130 to cut off power to the test computer 114, the cell 112 and the disk drive 110, as previously described.

In particular, the power trip simulator 202 provides a mechanism of tripping power to the test computer 114, the cell 112 and the disk drive 110 after reaching a set time. Operators of the power trip simulator 202 can enable this feature by pressing the counter on/off button 214 and the display 220 will glow to that indicate the counter feature is enabled. To set the counter with the triggering time duration, the hour/minute/set button 216 is used to select the segments (hours/minutes) and is used in conjunction with the increment button 210 and the decrement button 212 to select the hours/minutes for the triggering time duration and when pressed a third sets the triggering time duration which is displayed on the display 220. The counter ON/OFF button 214 can then be used to initiate the countdown timer or turn it off.

Thus, in operation, a trigger pulse 122 is sent from the disk drive 110 via pin 113 to power trip simulator 202 and upon receiving the trigger pulse 122, power trip simulator 202 counts down from the set triggering time duration. The countdown is displayed on the display 220. Once the set triggering time duration reaches zero, the power trip simulator 202 trips the relay circuit 130 which cuts off power to the test computer 114 and disk drive 110 by disabling AC source 140 by disabling line 133 (see cut-off 135). Power is then restored, after the power out time duration is counted, by closing the relay circuit 130 to enable line 133 to the AC source 140 to enable power to the test computer 114 and via line 115 to the cell 112 and disk drive 110.

The countdown of the power out time duration may be displayed on the display 220. Further, the increment button 210, the decrement button 212, the counter on/off button 214, hour/minute/set button and the display 220, as previously described, may allow an operator to program the power out time duration for the relay circuit 130.

After power is restored, the test computer 114 may be used to debug errors associated with the disk drive 110 that occur from the simulated power trip, as previously described. In this way, feed forward testing occurs utilizing the disk drive test system 200 to simulate a power trip to the cell 112 and the disk drive 110 such that recovery issues are identified, debugged, and fixed before it occurs in real-time during manufacturing testing in the complete disk drive test platform system. By performing a power trip in a simulated environment, the firmware code of the disk drive can be debugged and fixed such that these errors will not occur during actual manufacturing testing such that a great deal of manufacturing time and costs are saved. Additionally, this power trip simulator implementation is relatively low cost to develop, provides a very user friendly environment for operators and technicians, can be used in any process environment irrespective of process sequence, is very mobile and can be carried around, and is very well suited for bench testing.

Figure 3:
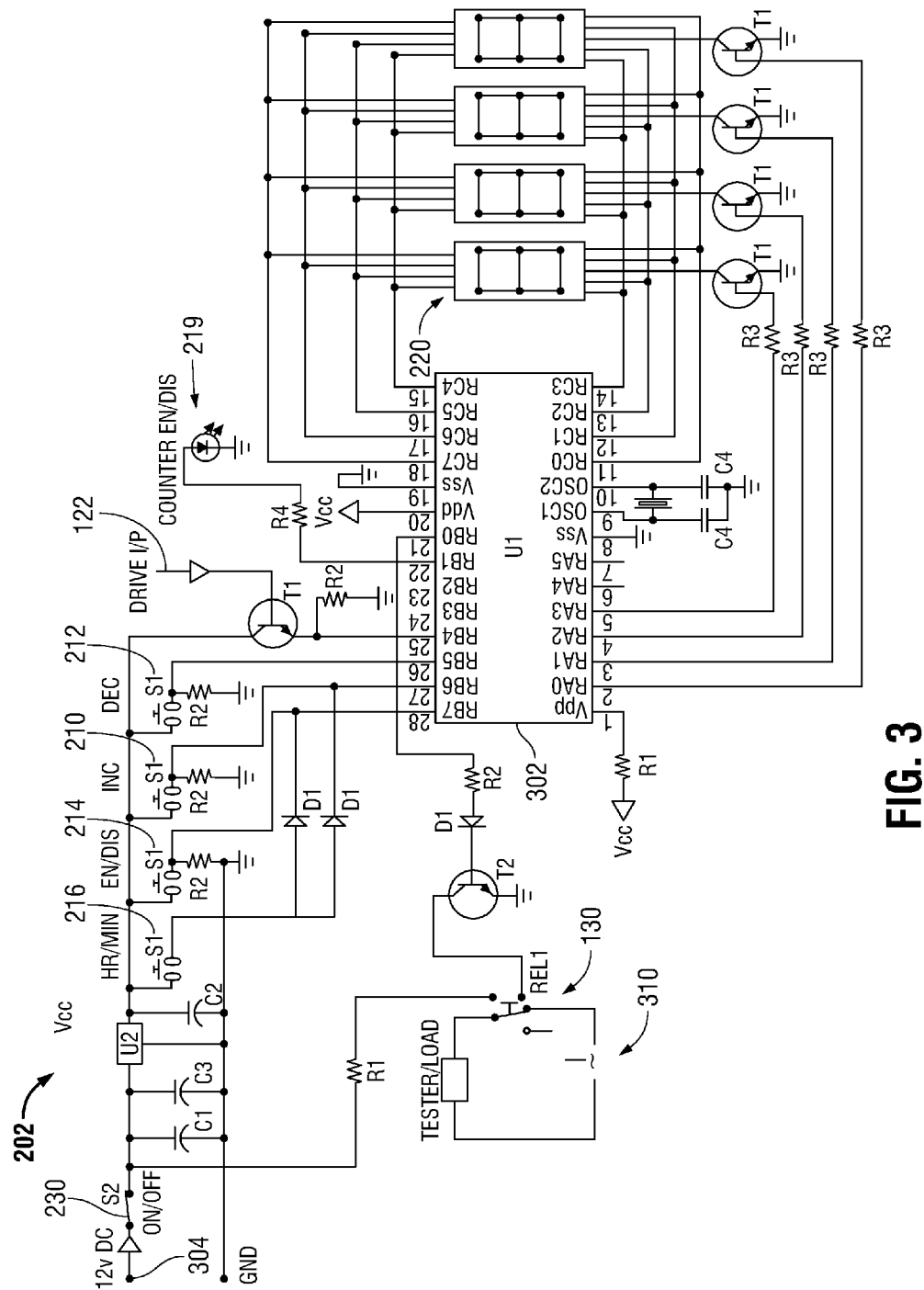
FIG. 3 is a schematic circuit diagram of a particular type of power trip simulator, according to one embodiment of the invention.

With brief reference now to FIG. 3, a schematic circuit diagram of the power trip simulator 202 is illustrated, according to one embodiment of the invention. It should be appreciated that this is just one example of a power strip simulator 202 that may be used for illustrative purposes and that a wide variety of other implementations may be utilized. The power strip simulator 202 may include a microcontroller 302. The on-off button 230 controls power delivered by DC voltage 304 and through various capacitors and diodes to power the microcontroller 302. Further, the hour/minute/set button 216, the counter button 214, the increment button 210, and the decrement button 212 are connected to the microcontroller 302 via associated lines. The trigger pulse 122 is connected via a transistor to the microcontroller 302. Also, the counter 220 is connected to the microcontroller 302. In particular, the seven segment display of hour/minute 220 is connected to the microcontroller 302 in accompaniment with various transistors and LED 219. Moreover, power strip simulator 202 includes relay circuit 130 coupled to the microcontroller 302 such that the microcontroller 302 controls turning the relay circuit 130 on/off. As previously described, in order to cut off power to the test computer and disk drive the AC source is disabled (via relay circuit 130 turned on—away from tester/load AC power 310) and then power can be restored to the test computer and disk drive by restoring power to the AC source (via relay circuit 130 turned off—back to tester/load and AC power 310).

In this example, the microcontroller 302 may be a PIC16F73 microcontroller that is an 8-bit microcontroller with 8-bit and 16-bit timers and may have external interrupts with edge triggering features and two 8-bit ports and one 5-bit port. The microcontroller 302 may have an 8-bit timer that is used for seven segments dynamic refreshment; and a 16-bit timer used for counter (up/down) update, external interrupts (8-bit input port) with edge triggering that are used for drive pulse triggering input, and keypad entries. The microcontroller 302 may have an 8-bit output port that is used for seven segment display, relay control and a 5-bit output port used as a display driver. The microcontroller 302 components are controlled by firmware with interrupt service routines (ISRs). As to external interrupts, four Port-B I/O pins are configured as input pins with external interrupt feature enabled. The edge triggering feature is set to be fired during the rising pulse and external pull downs are used to support the keypad feature and to receive triggering pulse from the drive. The interrupts triggered by any of these pins are serviced in ISRs. As to output ports, one Port-B pin is configured as an output pin and is used to control the relay circuit 130 with a transistor to have 12V switching. Port-C pins are configured as output to send the seven segment display data out. Further, four pins of Port-A are used as display drivers for seven segments. As to internal timers, an 8-bit timer is used for dynamic refreshment of the seven segment data and seven segment drivers and the frequency may be set to approximately 20 Hz. i.e., each seven segment will be refreshed in the same time period of 50 ms. Also, a 16-bit timer is used as counter (up/down) which will trigger interrupt every second, this is used to update the seven segment display data based on the set time (HH:MM/SS) if the counter feature is ON. As to power source, a 12V DC power is used as input source which is then regulated to 5V for the microcontroller 302 and other active components. The 12V DC is dedicated for relay control which is mainly used to control the power tripping and recovery of the test computer.

It should be appreciated that the above-described power trip simulator 202 of FIG. 3 utilizing a microcontroller is just one example of power trip simulator that may be utilized with embodiments of the invention. A wide variety of different types of power trip simulator may be utilized to implement embodiments of the invention.

For purposes of the present specification, it should be appreciated that the terms "microcontroller", "processor", "controller", "computer" etc., refer to any machine or collection of logic that is capable of executing a sequence of instructions and shall be taken to include, but not limited to, general purpose microprocessors, special purpose microprocessors, central processing units (CPUs), digital signal processors (DSPs), application specific integrated circuits (ASICs), multi-media controllers, signal processors, microcontrollers, etc.

Thus, components of the various embodiments of the invention may be implemented as hardware, software, firmware, microcode, or any combination thereof. When implemented in software, firmware, or microcode, the elements of the embodiment of the invention are the program code or code segments that include instructions to perform the necessary tasks. A code segment may represent a procedure, a function, a sub-program, a program, a routine, a sub-routine, a module, a software package, or any combination of instructions, data structures, or program statements.

The program, instruction, or code segments may be stored in a processor readable medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

While embodiments of the invention and their various electrical, mechanical and functional components have been described in particular embodiments, it should be appreciated that the embodiments can be implemented with a wide variety of differing electrical, mechanical and functional components, and combinations thereof. Further, although one particular embodiment has been described as being employed for use in a disk drive manufacturing process, the embodiments of the invention may be implemented with numerous other types of manufacturing processes to manufacture a wide variety of different types of devices.

That which is claimed is:

1. A disk drive test system to simulate a power trip, the disk drive test system comprising:
   a disk drive coupled to a cell;
   a test computer coupled to the cell and the disk drive; and
   a power trip simulator coupled to the disk drive and the test computer, the power trip simulator configured to cut off power to the test computer, the cell, and the disk drive in response to a trigger pulse received from the disk drive, wherein the power trip simulator restores power to the test computer, the cell, and the disk drive after a pre-set time duration,
   wherein code to instruct the disk drive to transmit the trigger pulse is transmitted from the test computer to the disk drive and is stored in a flash memory of the disk drive.

2. The disk drive test system of claim 1, further comprising a test pin connected to the disk drive, the test pin to transmit the trigger pulse from the disk drive to the power trip simulator.

3. The disk drive test system of claim 1, wherein the power trip simulator further comprises a relay circuit having a pre-set time duration, the relay circuit being triggered to cut off power to the test computer, the cell, and the disk drive in response to the trigger pulse received from the disk drive and to restore power to the test computer, the cell, and the disk drive after the pre-set time duration.

4. The disk drive test system of claim 1, wherein the power trip simulator further comprises a relay circuit having a programmable time duration, the relay circuit being triggered to cut off power to the test computer, the cell, and the disk drive in response to the trigger pulse received from the disk drive and to restore power to the test computer, the cell, and the disk drive after the programmable time duration.

5. The disk drive test system of claim 4, wherein the power trip simulator includes an increment button and a decrement button and a display to allow an operator to select the programmable time duration to restore power.

6. The disk drive test system of claim 4, wherein the power strip simulator includes an increment button and a decrement button to allow an operator to select a triggering time duration, the triggering time duration to measure a time duration after receiving the trigger pulse from the disk drive before triggering the relay circuit to cut off power to the test computer, the cell, and the disk drive.

7. The disk drive test system of claim 1, wherein the power trip simulator further comprises a microcontroller.

8. The disk drive test system of claim 1, wherein the test computer is used to debug errors associated with the disk drive from the simulated power trip.

9. A method to simulate a power trip, the method comprising:
   transmitting a trigger pulse from a disk drive to a power trip simulator;
   simulating a power trip to the disk drive and a test computer by cutting off power to the test computer and the disk drive by the power trip simulator; and
   restoring power with the power trip simulator to the test computer and the disk drive after a pre-set time duration,
   wherein code to instruct the disk drive to transmit the trigger pulse is transmitted from the test computer to the disk drive and is stored in a flash memory of the disk drive.

10. The method of claim 9, wherein a test pin is connected to the disk drive, the test pin to transmit the trigger pulse from the disk drive to the power trip simulator.

11. The method of claim 9, wherein the power trip simulator comprises a relay circuit having a pre-set time duration, the relay circuit being triggered to cut off power to the test computer and the disk drive in response to the trigger pulse received from the disk drive and to restore power to the test computer and the disk drive after the pre-set time duration.

12. The method of claim 9, wherein the power trip simulator comprises a relay circuit having a programmable time duration, the relay circuit being triggered to cut off power to the test computer and the disk drive in response to the trigger pulse received from the disk drive and to restore power to the test computer and the disk drive after the programmable time duration.

13. The method of claim 12, wherein the power trip simulator includes an increment button and a decrement button and a display to allow an operator to select the programmable time duration to restore power.

14. The method of claim 12, wherein the power trip simulator includes an increment button and a decrement button to allow an operator to select a triggering time duration, the triggering time duration to measure a time duration after receiving the trigger pulse from the disk drive before triggering the relay circuit to cut off power to the test computer and the disk drive.

15. The method of claim 9, wherein the power trip simulator further comprises a microcontroller.

16. The method of claim 9, wherein the test computer is used to debug errors associated with the disk drive from the simulated power trip.

* * * * *